(12) United States Patent
Ohkubo

(10) Patent No.: US 6,449,502 B1
(45) Date of Patent: *Sep. 10, 2002

(54) BONE MEASUREMENT METHOD AND APPARATUS

(75) Inventor: Takeshi Ohkubo, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/161,701

(22) Filed: Sep. 29, 1998

(30) Foreign Application Priority Data

Sep. 30, 1997 (JP) .............................. 9-266565

(51) Int. Cl.$^7$ ................................ A61B 5/05
(52) U.S. Cl. .................. 600/407; 600/425; 382/128; 382/132; 382/280; 382/286; 378/42; 128/922
(58) Field of Search .............................. 378/54, 57, 58, 378/42, 207, 285, 294; 382/132, 280, 286; 128/922; 600/407, 425; 364/413.15

(56) References Cited

U.S. PATENT DOCUMENTS

| | | | | |
|---|---|---|---|---|
| 4,783,751 A | * | 11/1988 | Ehrlich et al. ................. | 702/11 |
| 5,390,291 A | * | 2/1995 | Ohashi ........................ | 395/119 |
| 5,761,334 A | * | 6/1998 | Nakajima et al. ........... | 382/132 |
| 5,835,619 A | * | 11/1998 | Morimoto et al. .......... | 382/132 |
| 5,910,972 A | * | 6/1999 | Ohkubo et al. ............... | 378/54 |
| 5,915,036 A | * | 6/1999 | Grunkin et al. ............. | 382/132 |
| 6,014,474 A | * | 1/2000 | Takeo et al. ................. | 382/308 |

OTHER PUBLICATIONS

Journal of Microscopy, vol. 142, Pt3, Jun. 1986, pp. 341–349.
Bone, 10, 7–13 (1989).
Extraction of Small Calcified Patterns with A Morphology Filter Using A Multiply Structure Element, Collected Papers Of The Institute of Electronics and Communication Engineers of Japan, D–II, No. 7, pp. 1170–1176, Jul. 1992.
Fundamentals of Morphology and Its Application to Mammogram Processing, Medical Imaging Technology, vol. 12, No. 1, Jan. 1994.

* cited by examiner

Primary Examiner—Marvin M. Lateef
Assistant Examiner—Jeoyuh Lin
(74) Attorney, Agent, or Firm—Sughrue Mion, PLLC

(57) ABSTRACT

In a bone measurement method, an index value representing a condition of a structure of a bone tissue is acquired. Bone tissue pattern emphasis processing is carried out on a radiation image of an object, which contains at least the bone tissue, and in accordance with a morphology operation. Index value acquisition processing is then carried out on a bone tissue image, which has been obtained from the bone tissue pattern emphasis processing and represents an emphasized pattern of the structure of the bone tissue. The index value accurately representing the condition of the structure of the bone tissue is thereby acquired non-invasively in accordance with the radiation image.

6 Claims, 9 Drawing Sheets

F I G . 1
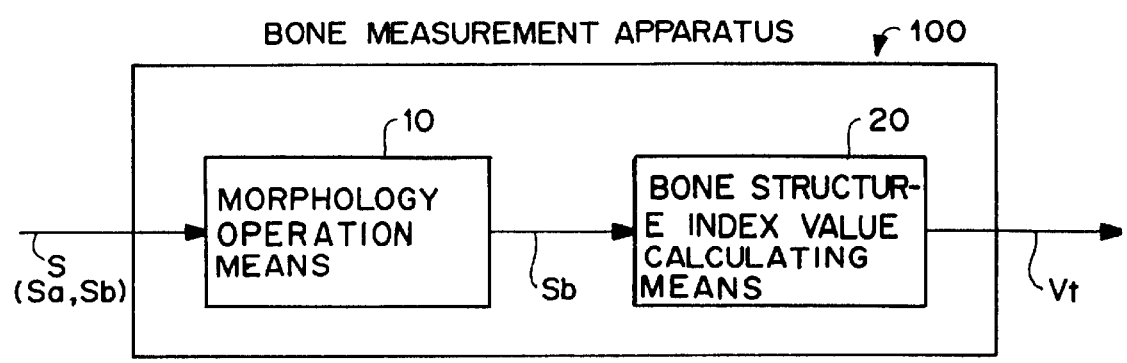

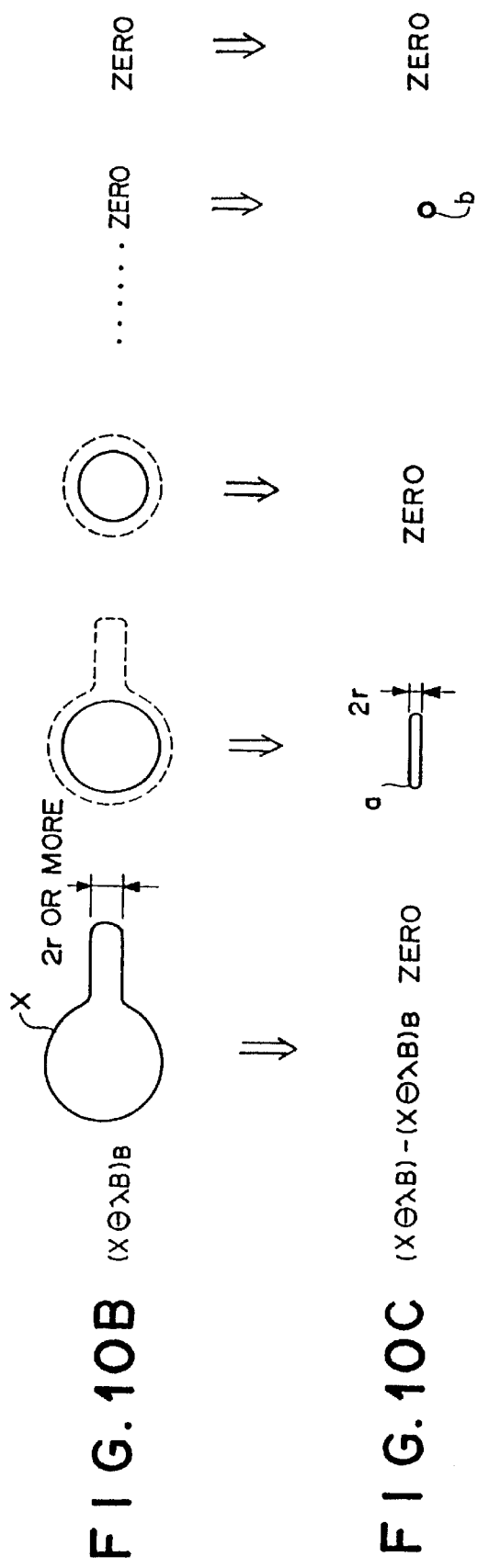
FIG. 10A $X \ominus \lambda B$
FIG. 10B $(X \ominus \lambda B)B$
FIG. 10C $(X \ominus \lambda B) - (X \ominus \lambda B)B$
FIG. 10D $\bigcup_{\lambda=0}^{N} \{(X \ominus \lambda B) - (X \ominus \lambda B)B\} = \{$ 〰️ , ₒ $\}$

BONE MEASUREMENT METHOD AND APPARATUS

BACKGROUND OF THE INVENTION

1. Field of the Invention

This invention relates to a bone measurement method and apparatus. This invention particularly relates to a method and apparatus for acquiring a quantitative index value, which represents a condition of a structure of a bone tissue of a human body, or the like, the condition being useful in making a diagnosis of osteoporosis, or the like, in accordance with a radiation image.

2. Description of the Prior Art

Bone mineral analysis, i.e., quantitative determination of amounts of calcium in bones, is useful for making a diagnosis for preventing fractures of bones.

Specifically, the amounts of the bone mineral are determined by the density of bone trabeculae, which are the cancellous matter constituting the internal regions of bones, i.e. the bone density. Therefore, if the bone density is low, the image density of a bone pattern in a bone image will become high. If the bone density is high, the image density of the bone pattern in the bone image will become low.

Therefore, by investigating small changes in the amounts of calcium contained in bones, osteoporosis can be found early, and fractures of the bones can be prevented.

Various techniques for bone mineral analysis have been proposed and used in practice. Such techniques include microdensitometry (MD technique), single photon absorptiometry (SPA technique), dual photon absorptiometry (DPA technique), quantitative digited radiography (QDR technique), quantitative computer tomography (DQCT technique), and dual energy quantitative computer tomography (DQCT technique).

The above-enumerated techniques are the ones for measuring the so-called "bone density." The bone density has heretofore been utilized popularly as an index value for a diagnosis of osteoporosis. Recently, besides the bone density value, it has been proposed to quantitatively represent the condition of a bone structure as an index value.

Specifically, in a simple sense, the bone density value is the value of the ratio of the mass to the volume. Therefore, the bone density value does not reflect a difference in condition of distribution of bone trabeculae, which are the substance as the bone for supporting a load, i.e. a difference in bone structure. However, primarily, osteoporosis is the problem of the bone strength. The bone strength markedly depends upon the condition of a distribution of bone trabeculae. Therefore, a technique for representing the condition of a bone structure as an index value is a technique useful for a diagnosis of osteoporosis.

By way of example, as an index value for representing the condition of a bone structure, there have heretofore been known a star volume and an index value obtained with node-strut analysis.

As an aid in simplifying the explanation, a processing technique for calculating the star volume as an index value will hereinbelow be referred to as the star volume technique. Also, a processing technique for calculating an index value with node-strut analysis will hereinbelow be referred to as the node-strut analysis technique.

FIG. 3 is an explanatory view showing index values with the star volume technique. In the star volume technique, marrow space star volume (Vm) and trabecular star volume (Vt) are defined. The marrow space star volume (Vm) represents the mean value of the values of the bone marrow cavity volume of the regions, each of which extends from a predetermined point, a, in the bone marrow cavity along every direction without being obstructed by the bone trabeculae. The trabecular star volume (Vt) represents the mean value of the values of the volume of the regions, each of which extends from a point, b, in the bone trabecula along every direction to the end of the bone trabecula. In FIG. 3, the hatched regions indicate the bone trabeculae, and the other region indicates the bone marrow cavity. The star volume is considered as being a gap-free stereological index, which represents the size of the bone trabecula in the bone marrow cavity as a three-dimensional value in units of $mm^3$ or $\mu m^3$ by elaborating the sampling technique. In cases where the continuity of the bone trabeculae is high, Vm takes a small value. In cases where the level of disappearance or porosity of the bone trabeculae is high, Vm takes a large value. Conversely, in cases where the continuity of the bone trabeculae is high, Vt takes a large value. In cases where the level of disappearance or porosity of the bone trabeculae is high, vt takes a small value.

The value of Vmi at an arbitrary point i in the bone marrow cavity is defined by Formula (1) shown below.

$$Vmi = (\pi/3) \times l_{0m}^3 \quad (1)$$

In Formula (1), in cases where the length, over which the bone-marrow cavity is continuous along an arbitrary direction extending from the point i, is represented by $l_0$, $l_{0m}^3$ represents the mean value of the values $l_0^3$ calculated with respect to all of radial directions extending from the point i.

The value of Vtj at an arbitrary point j in the bone trabecula is defined by Formula (2) shown below.

$$Vtj = (\pi/3) \times \Sigma l_1^4 / \Sigma l_1 \quad (2)$$

wherein $l_1$ represents the length, over which the bone trabecula is continuous along an arbitrary direction extending from the point j. The values of $l_1$ are calculated with respect to all of radial directions extending from the point j, and $\Sigma$ represents the calculation of the sum of the values with respect to all of the radial directions.

In such cases, Vmi may be calculated for each sampling point, and the mean value of the Vmi values, which have been calculated for all of the sampling points, may be taken as Vm. Also, Vtj may be calculated for each sampling point, and the mean value of the vtj values, which have been calculated for all of the sampling points, may be taken as Vt.

As the index value representing the bone trabecula structure, either one of Vm and Vt may be employed.

Also, for example, as illustrated in FIG. 4, the three-dimensional coordinate system, which has the coordinate axes for the age of an object, the bone density value, and the value of Vt, is formed. A judgment as to the condition of the bone tissue is made in accordance with a position on the three-dimensional coordinate system, at which the received results are plotted. Specifically, in cases where the age of the object, the bone density value, and the value of Vt are located at a point P1, it is judged that the bone tissue is in the condition A (e.g., the condition suspected to be osteoporosis). In cases where the age of the object, the bone density value, and the value of Vt are located at a point P2, it is judged that the bone tissue is in the condition B (the condition requiring care). Also, in cases where the age of the object, the bone density value, and the value of Vt are located at a point P3, it is judged that the bone tissue is in the condition C (the normal condition).

The node-strut analysis technique is a technique for two-dimensionally rating the continuity of the bone trabeculae. Specifically, a connection point, at which three or more bone trabeculae are connected with one another, is defined as a node (Nd) (indicated by the white dot in FIG. 5), and a terminal point, at which the bone trabecula is not connected with other bone trabeculae, is defined as a terminus (Tm) (indicated by the black dot in FIG. 5). As illustrated in FIG. 5, the center lines (struts) of the bone trabeculae, which lines connect the points, are classified into NdNd (the strut connecting the connection points with each other), NdTm (the strut connecting a connection point and a terminal point with each other), TmTm (the strut connecting the terminal points with each other), CtNd (the strut connecting Ct, i.e. the cortical bone, and a connection point each other), and CtTm (the strut connecting the cortical bone and a terminal point with each other). The lengths of the respective struts are measured.

Thereafter, the index values described below are defined in accordance with the lengths of the struts, the number $N_{Nd}$ of the connection points Nd, and the number $N_{Tm}$ of the terminal points Tm.

(1) Index Value Concerning the Length

The ratio (%) of the length of each strut to the sum $T_{SL}$ of lengths of all struts:

$NdNd/T_{SL}$
$NdTm/T_{SL}$
$TmTm/T_{SL}$
$CtNd/T_{SL}$
$CtTm/T_{SL}$ (2) Index Value Concerning Length With Respect to Area The ratio (mm/mm$^2$) of the length of each strut to the area TV of the bone tissue (the sum of the bone trabeculae and the cortical bone, or only the bone trabeculae)

$T_{SL}/TV$
$NdNd/TV$
$NdTm/TV$
$TmTm/TV$
$CtNd/TV$
$CtTm/TV$ (3) Index Value Concerning Number $N_{Nd}/TV$: Number (/mm$^2$) of the connection points per area of the bone tissue $N_{Tm}/TV$: Number (/mm$^2$) of the terminal points per area of the bone tissue $N_{Nd}/N_{Tm}$: Ratio of the number of the connection points to the number of the terminal points With the index values described above, a large value of the index value related to the connection point Nd indicates a high continuity of the bone trabeculae. Also, a large value of the index value related to the terminal point Tm indicates a low continuity of the bone trabeculae.

The node-strut analysis technique is useful as a technique capable of directly and easily measuring the continuity of the bone trabeculae.

However, the aforesaid techniques for acquiring the index values, which represent the condition of the bone structure, have the problems in that a sample of the actual substance, i.e. a sliced specimen of the bone, must be utilized, and therefore the index values cannot be acquired non-invasively from the object body.

Attempt have heretofore been made in order to obtain an index value, which represents the condition of a structure of a bone tissue, in accordance with a radiation image, in which a pattern of the bone tissue is embedded. However, such techniques have the problems in that a practically acceptable measurement accuracy cannot be obtained due to overlapping of the bone tissue pattern upon a soft tissue pattern, fluctuations in image density and contrast, and the like.

SUMMARY OF THE INVENTION

The primary object of the present invention is to provide a bone measurement method, with which an index value accurately representing a condition of a structure of a bone tissue is capable of being acquired in accordance with a radiation image.

Another object of the present invention is to provide an apparatus for carrying out the bone measurement method.

A bone measurement method in accordance with the present invention is characterized by carrying out bone tissue pattern emphasis processing in accordance with a morphology operation on an image signal, which represents a radiation image, thereby extracting or emphasizing the pattern of a structure of the bone tissue, and calculating an index value, which represents a condition of the structure of the bone tissue, in accordance with an image, which represents the extracted or emphasized pattern of the structure of the bone tissue.

specifically, the present invention provides a bone measurement method, in which an index value representing a condition of a structure of a bone tissue is acquired, the method comprising the steps of:

i) carrying out bone tissue pattern emphasis processing on a radiation image of an object, which contains at least the bone tissue, the bone tissue pattern emphasis processing being carried out in accordance with a morphology operation, and ii) carrying out index value acquisition processing on a bone tissue image, which has been obtained from the bone tissue pattern emphasis processing and represents an emphasized pattern of the structure of the bone tissue.

The term "bone tissue" as used herein means the bone trabeculae, the bone marrow cavity, which is the cavity other than the bone trabeculae, the cortical bone, which covers the outer peripheries of the bone trabeculae and the bone marrow cavity, and the like. The term "condition of a structure of a bone tissue" as used herein primarily means the condition of distribution of the bone trabeculae and the bone marrow cavity.

As the index value representing the condition of the structure of the bone tissue, it is possible to employ Vm or Vt in accordance with the aforesaid star volume technique. It is also possible to employ $NdNd/T_{SL}$, $NdTm/T_{SL}$, $TmTm/T_{SL}$, $CtNd/T_{SL}$, $CtTm/T_{SL}$, $T_{SL}/TV$, $NdNd/TV$, $NdTm/TV$, $TmTm/TV$, $CtNd/TV$, $CtTm/TV$, $N_{Nd}/TV$, $N_{Tm}/TV$, or $N_{Nd}/N_{Tm}$ in accordance with the node-strut analysis technique, or the like.

As the bone tissue pattern emphasis processing in accordance with the morphology operation, skeleton processing may be employed. The morphology operation will be described hereinbelow.

The morphology operation (hereinbelow also referred to as the morphology processing) is the processing based upon algorithms of morphology, with which only a specific image portion, such as an abnormal pattern, is selectively extracted from an original image. The morphology processing has been studied as a technique efficient for detecting, particularly, a small calcified pattern, which is one of characteristic forms of mammary cancers. However, the image to be processed with the morphology processing is not limited to the small calcified pattern in a mammogram.

The morphology processing is carried out by using a structure element B corresponding to the size and the shape of the image portion to be extracted. The morphology processing has the features in that, for example, it is not affected by complicated background information, and the extracted image pattern does not become distorted.

Specifically, the morphology processing is advantageous over ordinary differentiation processing in that it can more accurately detect the geometrical information concerning the size, the shape, and the image density distribution of the calcified pattern.

How the morphology processing is carried out will be described hereinbelow by taking the detection of a small calcified pattern in a mammogram as an example.
(Fundamental operation of morphology processing)

In general, the morphology processing is expanded as the theory of sets in an N-dimensional space. As an aid in facilitating the intuitive understanding, the morphology processing will be described hereinbelow with reference to a two-dimensional gray level image.

The gray level image is considered as a space, in which a point having coordinates (x, y) has a height corresponding to an image density value f(x, y). In this case, it is assumed that the image signal representing the image density value f(x, y) is a high luminance-high signal level type of image signal, in which a low image density (i.e., a high luminance when the image is displayed on a CRT display device) is represented by a high image signal level.

Firstly, as an aid in facilitating the explanation, a one-dimensional function f(x) corresponding to the cross-section of the two-dimensional gray level image is considered. It is assumed that a structure element g used in the morphology operation is a symmetric function of Formula (3) shown below, which is symmetric with respect to the origin.

$$g^s(x)=g(-x) \quad (3)$$

It is also assumed that the value is 0 in a domain of definition G, which is represented by Formula (4) shown below.

$$G=\{-m, -m+1, \ldots, -1, 0, 1, \ldots, m-1, m\} \quad (4)$$

In such cases, the fundamental forms of the morphology operation are very simple operations carried out with Formulas (5), (6), (7), and (8) shown below.

$$\text{dilation; } [f \oplus G^s](i)=\max\{f(i-m), \ldots, f(i), \ldots, f(i+m)\} \quad (5)$$

$$\text{erosion; } [f \ominus G^s](i)=\min\{f(i-m), \ldots, f(i), \ldots, f(i+m)\} \quad (6)$$

$$\text{opening; } f_g=(f \ominus g^s) \oplus g \quad (7)$$

$$\text{closing; } f^g=(f \oplus g^s) \ominus g \quad (8)$$

Specifically, as illustrated in FIG. 6A, the dilation processing is the processing for retrieving the maximum value in the region of a width of ±m (which width is the value determined in accordance with the structure element B and corresponds to the mask size shown in FIG. 6A) having its center at a picture element of interest. As illustrated in FIG. 6B, the erosion processing is the processing for retrieving the minimum value in the region of the width of ±m having its center at the picture element of interest. The opening processing is equivalent to the processing in which the dilation processing is carried out after the erosion processing, i.e., the processing in which the maximum value is searched after the searching of the minimum value. Also, the closing processing is equivalent to the processing in which the erosion processing is carried out after the dilation processing, i.e., the processing in which the minimum value is searched after the searching of the maximum value.

More specifically, as illustrated in FIG. 6C, the opening processing is equivalent to the processing for smoothing the image density curve f(x) from the low luminance side, and removing a convex image density fluctuating portion (i.e., the portion at which the luminance is higher than that of the surrounding portions), which fluctuates in a region spatially narrower than the mask size of 2m.

Also, as illustrated in FIG. 6D, the closing processing is equivalent to the processing for smoothing the image density curve f(x) from the high luminance side, and removing a concave image density fluctuating portion (i.e., the portion at which the luminance is lower than that of the surrounding portions), which fluctuates in the region spatially narrower than the mask size of 2m.

In cases where the structure element g is not symmetric with respect to the origin, the dilation operation with Formula (5) is referred to as the Minkowski sum, and the erosion operation with Formula (6) is referred to as the Minkowski difference.

In cases where the image signal representing the image density value f(x) is a high image density-high signal level type of image signal, in which a high image density is represented by a high image signal level, the relationship between the image density value f(x) and the image signal value becomes reverse to the relationship between the image density value f(x) and the image signal value in the high luminance-high image signal level type of image signal. Therefore, the dilation processing, which is carried out on the high image density-high signal level type of image signal, coincides with the erosion processing, which is carried out on the high luminance-high signal level type of image signal as shown in FIG. 6B. The erosion processing, which is carried out on the high image density-high signal level type of image signal, coincides with the dilation processing, which is carried out on the high luminance-high signal level type of image signal as shown in FIG. 6A. The opening processing, which is carried out on the high image density-high signal level type of image signal, coincides with the closing processing, which is carried out on the high luminance-high signal level type of image signal as shown in FIG. 6D. Also, the closing processing, which is carried out on the high image density-high signal level type of image signal, coincides with the opening processing, which is carried out on the high luminance-high signal level type of image signal as shown in FIG. 6C.

The morphology processing is herein described with respect to the high luminance-high signal level type of image signal.

(Application to Detection of Calcified Patterns)

In order for a calcified pattern to be detected, it is considered to employ a difference method, in which a smoothed image signal is subtracted from the original image signal. However, with a simple smoothing method, it is difficult to discriminate the calcified pattern from an elongated non-calcified pattern (for example, a pattern of the mammary gland, a blood vessel, mammary gland supporting tissues, or the like). Therefore, Kobatake of Tokyo University of Agriculture and Technology, et al. have proposed a morphology filter, which is represented by Formula (9) shown below and is based upon the opening operation using a multiply structure element. [Reference should be made to "Extraction of Small Calcified Patterns with A Morphology Filter Using A Multiply Structure Element," Collected Papers of The Institute of Electronics and Communication Engineers of Japan, D-II, Vol. J75-D-II, No. 7, pp. 1170–1176, July 1992; and "Fundamentals of Morphology and Its Application to Mammogram Processing," Medical Imaging Technology, Vol. 12, No. 1, January 1994.]

$$P = f - \max_{i \in (1,\cdots,M)} \{(f \ominus Bi) \oplus Bi\} \quad (9)$$
$$= f - \max_{i \in (1,\cdots,M)} \{f_{Bi}\}$$

In Formula (9), Bi (wherein i=1, 2, . . . , n) represents n number of linear structure elements, each of which has a size corresponding to the total size of m number of picture elements (in the example shown in FIG. 7, nine-picture element, four-direction structure elements are employed, and m=9, n=4). (The structure elements, as a whole, will hereinbelow be referred to as the m-picture element, n-direction multiply structure element.) In cases where the structure element Bi is set to be larger than the calcified pattern to be detected, a calcified pattern, which is a convex signal change portion finer than the structure element Bi (i.e., which is an image portion fluctuating in a spatially narrow region) and has luminance values larger than the luminance values of the surrounding portions, is removed in the opening processing. On the other hand, an elongated non-calcified pattern, such as a pattern of the mammary gland, is longer than the structure element Bi. Therefore, in cases where the inclination of the non-calcified pattern (i.e, the direction along which the non-calcified pattern extends) coincides with one of the directions of the four structure elements Bi, the non-calcified pattern remains unremoved after the opening processing, i.e. the operation of the second term of Formula (9), has been carried out. Therefore, when the smoothed image signal obtained from the opening processing (i.e. the signal representing the image, from which only the calcified pattern has been removed) is subtracted from the original image signal f, an image can be obtained which contains only the small calcified pattern. This is the concept behind Formula (9).

As described above, in cases where the image signal is of the high image density-high signal level type, the image density value of the calcified pattern is smaller than the image density values of the surrounding image portions, and the calcified pattern constitutes a concave signal change portion with respect to the surrounding portions. Therefore, the closing processing is applied in lieu of the opening processing, and Formula (10) shown below is applied in lieu of Formula (9).

$$P = f - \min_{i \in (1,\cdots,M)} \{(f \oplus Bi) \ominus Bi\} \quad (10)$$
$$= f - \min_{i \in (1,\cdots,M)} \{f^{Bi}\}$$

The closing processing carried out with Formula (10), which is an example of the morphology operation, will hereinbelow be described in detail.

Specifically, the morphology operation is carried out on the image density value Sorg, which is represented by the high image density-high signal level type of image signal. With the morphology operation, the maximum value processing (i.e., the dilation processing) is carried out on the image signal, which has a distribution of the image density value Sorg indicated by, for example, the solid line in FIG. 8A, by using a linear structure element B, which is constituted of three picture elements and is shown in FIG. 8B. As a result, an image density value Si of a certain picture element of interest is converted into $S_i'$, which takes the maximum value $S_{i+1}$ of the values of the three adjacent picture elements (determined by the structure element B) having their center at the picture element of interest. The operation is carried out for all of the picture elements constituting the image, each of them being taken as the picture element of interest. In this manner, the image signal having the distribution of the image density value Sorg indicated by the solid line in FIG. 8A is converted into the maximum value signal having the distribution of the image density value Sorg', which is indicated by the broken line in FIG. 8A.

Thereafter, the minimum value processing (i.e., the erosion processing) is carried out on the maximum value signal, which has been obtained from the maximum value processing, by using the structure element B. As a result, the maximum value signal $S_i'$, corresponding to the picture element of interest indicated by the broken line in FIG. 8A is converted into $S_i''$ (=$S_i$), which takes the minimum value $S_{i-1}'$ of the values of the three adjacent picture elements having their center at the picture element of interest. The operation is carried out for all of the picture elements constituting the image, each of them being taken as the picture element of interest. In this manner, the minimum value signal Sorg" having the distribution indicated by the chained line in FIG. 8A is obtained from the minimum value processing. The image signal indicated by the chained line in FIG. 8A has the distribution such that the image portion corresponding to the signal change portion, at which the original image signal Sorg fluctuates in a spatially narrower range than the size of the structure element B, has been eliminated, and such that the image portion corresponding to the signal change portion, at which the original image signal Sorg fluctuates in a spatially wider range than the size of the structure element B, and the image portion, at which the original image signal Sorg does not fluctuates, are kept in the original forms. More specifically, the aforesaid processing (i.e., the closing processing) serves as the processing for smoothing the image density distribution from the high image density side.

The value having been obtained from the closing processing (i.e., the value having been obtained by carrying out the maximum value processing on the original image signal Sorg and then carrying out the minimum value processing) is subtracted from the original image signal Sorg, and a value Smor is thereby obtained. The thus obtained value Smor represents the image portion corresponding to the signal change portion, at which the signal value fluctuates in a spatially narrower range than the size of the structure element B and which has been eliminated by the aforesaid closing operation.

Fundamentally, an image signal represents spatial coordinates (x, y), which constitute a two-dimensional element, and a signal value f(x, y), which constitutes a third dimensional element. However, in the foregoing, as an aid in facilitating the understanding, the morphology operation is described with respect to the one-dimensional image signal distribution curve, which appears in a predetermined cross section of the image expanded in the two-dimensional plane. Therefore, actually, it is necessary for the foregoing explanation to be applied to a two-dimensional image. Also, for the processing of a two-dimensional image, the multiply structure element is employed.

The skeleton processing in accordance with the morphology operation will be described hereinbelow.

Ordinarily, the skeleton processing is carried out for extracting skeletons of figures. A skeleton can be considered as being a set of center points of circular disks inscribed in a figure. Specifically, for example, as for the figures, which are indicated by medium-thick solid lines in FIGS. 9A through 9E, the skeletons of the figures are those indicated by the thick solid lines.

How the skeleton processing is carried out in accordance with the aforesaid morphology operation will be described hereinbelow. In such cases, the skeleton processing may be represented by Formula (11) or Formula (12) shown below.

$$S\ mor = \bigcup_{\lambda=n1}^{N} \left\{ \max_{i=1,\cdots,n} (S\ org \ominus \lambda Bi) - \max_{i=1,\cdots,n} (S\ org \ominus \lambda Bi)_B \right\} \quad (11)$$

wherein the expression x−λY represents λ times of Minkowski difference operations (erosion processings) carried out with the structure element Y and on the image signal X, the expression $(X-\lambda Y)_y$ represents the opening processing carried out with the structure element Y and on the image signal (X−λY), and U {} represents the union of sets of {} with λ=n1, n1+1, . . . , N.

$$S\ mor = \bigcup_{\lambda=n1}^{N} \left\{ \min_{i=1,\cdots,n} (S\ org \oplus \lambda Bi) - \min_{i=1,\cdots,n} (S\ org \oplus \lambda Bi)^B \right\} \quad (12)$$

wherein the expression X⊕λY represents λ times of Minkowski sum operations (dilation processings) carried out with the structure element Y and on the image signal X, the expression $(X \oplus \lambda Y)^Y$ represents the closing processing carried out with the structure element Y and on the image signal (X⊕λY), and U {} represents the union of sets of {} with λ=n1, n1+1, . . . , N.

Formula (11) or Formula (12) is selected in accordance with whether the image is represented by the high image density-high signal level type of image signal or the high luminance-high signal level type of image signal. In cases where the skeleton of an image portion having a low image density (a high luminance) is to be extracted from the image, which is represented by the high image density-high signal level type of image signal, Formula (11) is employed. In cases where the skeleton of an image portion having a low luminance (a high image density) is to be extracted from the image, which is represented by the high luminance-high signal level type of image signal, Formula (12) is employed. There is no substantial difference in effects between Formula (11) and Formula (12).

For example, as for an image formed on negative film (an image represented by the high image density-high signal level type of image signal), the image density of the bone pattern is lower than the image density of the other image portions. Also, the image density of a portion, at which a bone trabecula pattern is located, is low, and the image density of a portion, at which no bone trabecula pattern is located, is high. In such cases, the skeleton processing is carried out with respect to the bone trabecula pattern, which has a lower image density than the image density of the surrounding areas. Therefore, in such cases, Formula (11) may be employed.

FIG. 10 shows an example of the skeleton processing carried out with Formula (11) by employing a circle having a radius r as the structure element B. In FIG. 10, the skeleton processing is carried out on the figure, in which the region outward from the contour of the figure has a high image density, and the region inward from the contour of the figure has a low image density.

As illustrated along the top row in FIG. 10, the erosion processing is firstly carried out on the figure by using the structure element B. At the stage of λ=0 (0'th erosion processing with the structure element B), no change occurs on the figure.

At the stage of λ=1 (first erosion processing with the structure element B), the figure is eroded inwardly by a depth corresponding to the radius r of the structure element B.

At the stage of λ=2 (second erosion processing with the structure element B), the portion projecting from the circle portion of the figure disappears perfectly.

The same operation is repeated. At the stage of λ=N−1 (N−1'th erosion processing with the structure element B), the figure is eroded to the circle having a radius not larger than the radius r.

The second row in FIG. 10 shows the figures obtained by carrying out the opening processing with the structure element B and on the images, which have been obtained from the respective stages of the erosion processing (λ=0, 1, 2, . . . , N−1, N) with the structure element B.

The third row in FIG. 10 shows the figures obtained by subtracting the figures illustrated along the second row from the figures illustrated along the top row, which figures have been obtained at the corresponding stages of the processing.

As illustrated along the third row in FIG. 10, at the stage of λ=1, the skeleton element at the portion, which projects from the circle portion of the original figure, is extracted. Also, at the stage of λ=N−1, the skeleton element of the circle portion of the original figure is extracted.

As described above, Formula (11) represents the operations for carrying out the erosion processing on the original figure, thereafter carrying out the opening processing on the resulting figures, subtracting the figures from each other, which have been obtained at the corresponding stages of the processing, and calculating the union of sets of the results of the subtraction.

Formula (12) is efficient for extracting the skeleton elements for a figure, in which the relationship of the image density levels is reverse to the relationship in Formula (11). Formula (12) represents the operations for carrying out the dilation processing on the original figure, thereafter carrying out the closing processing on the resulting figures, subtracting the figures from each other, which have been obtained at the corresponding stages of the processing, and calculating the union of sets of the results of the subtraction, the skeleton elements being thereby extracted.

As the union of sets in each of Formula (11) and Formula (12), the union of sets of only the comparatively large n1 values, e.g. only the union of sets of λ=2, 3, 4, 5, and so on, excluding n1=0, 1, should preferably be employed, and the skeleton elements obtained in this manner should preferably be displayed. In such cases, a change in the condition of the bone trabeculae can be found more easily. Specifically, at the stages of λ=0 and 1, noise components having a markedly high frequency are also extracted. By the exclusion of the noise components from the union of sets, an image can be obtained, which has good image quality and can serve as an effective tool in, particularly, the efficient and accurate diagnosis.

The morphology operation and the skeleton processing are carried out in the manner described above.

In lieu of the ordinary radiation image of the object, which contains the bone tissue, an energy subtraction image may be subjected to the emphasis processing in accordance with the morphology operation. The energy subtraction image is obtained by carrying out extraction or emphasis of the bone tissue pattern in accordance with two or more radiation images for energy subtraction processing, which radiation images have been formed with two or more kinds of radiation having different energy distributions.

A bone measurement apparatus in accordance with the present invention is characterized by carrying out bone tissue pattern emphasis processing in accordance with a morphology operation on an image signal, which represents a radiation image, thereby extracting or emphasizing the pattern of a structure of the bone tissue, and calculating an index value, which represents a condition of the structure of the bone tissue, in accordance with an image, which represents the extracted or emphasized pattern of the structure of the bone tissue.

Specifically, the present invention also provides a bone measurement apparatus, comprising a bone structure index value calculating means for calculating an index value representing a condition of a structure of a bone tissue, wherein the apparatus further comprises a morphology operation means for carrying out bone tissue pattern emphasis processing on a radiation image of an object, which contains at least the bone tissue, the bone tissue pattern emphasis processing being carried out in accordance with a morphology operation, and the bone structure index value calculating means carries out index value acquisition processing on a bone tissue image, which has been obtained from the bone tissue pattern emphasis processing and represents an emphasized pattern of the structure of the bone tissue.

In the bone measurement apparatus in accordance with the present invention, the bone tissue, the condition of the structure of the bone tissue, the index value, the bone tissue pattern emphasis processing in accordance with the morphology operation, and the skeleton processing have the same meanings as those in the aforesaid bone measurement method in accordance with the present invention.

With the bone measurement method and apparatus in accordance with the present invention, the bone tissue pattern emphasis processing in accordance with the morphology operation, such as the skeleton processing, is carried out on the image signal representing the radiation image. The pattern of the structure of the bone tissue can thus be extracted or emphasized accurately in the manner non-invasive to the object. In accordance with the image, which represents the extracted or emphasized pattern of the structure of the bone tissue, the index value representing the condition of the structure of the bone tissue, such as the index value in accordance with the star volume technique or the index value in accordance with the node-strut analysis technique, is calculated. In this manner, information representing the condition of the structure of the bone tissue, which information is useful for, particularly, osteoporosis, can be obtained as the quantitative index value.

BRIEF DESCRIPTION OF THE DRAWINGS

FIG. 1 is a block diagram showing an embodiment of the bone measurement apparatus in accordance with the present invention, FIG. 10 is an explanatory view showing how skeleton processing is carried out.

DESCRIPTION OF THE PREFERRED EMBODIMENTS

The present invention will hereinbelow be described in further detail with reference to the accompanying drawings.

FIG. 1 is a block diagram showing an embodiment of the bone measurement apparatus in accordance with the present invention.

With reference to FIG. 1, a bone measurement apparatus 100 comprises a morphology operation means 10 and a bone structure index value calculating means 20. The morphology operation means 10 carries out skeleton processing in accordance with a morphology operation on an image signal (hereinbelow referred to as the radiation image information) S, which represents a radiation image P of an object, such as a human body containing a soft tissue Pa and a bone tissue Pb. The morphology operation means 10 thereby extracts image information Sb, which represents an image (a skeleton image) corresponding to the bone tissue Pb. The bone structure index value calculating means 20 carries out processing for acquiring an index value Vt, which represents the condition of the structure of the bone tissue Pb, on the image information Sb having been extracted by the morphology operation means 10.

By way of example, the image information S, which is fed into the bone measurement apparatus 100, may be the image signal obtained in the manner described below. Specifically, a radiation image of an object at least containing the bone tissue, such as a human body, is recorded on a sheet provided with a layer of a stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal, which has thus been obtained from a single radiation image, is utilized as the image information S. Alternatively, the image information S may be an image signal representing an energy subtraction image, in which the bone tissue pattern has been extracted to some extent and which is obtained from energy subtraction processing carried out on two or more radiation images of a single object having been formed with two or more kinds of radiation having different energy distributions. As another alternative, in cases where the image portion, for which the index value representing the condition of the structure of the bone tissue is to be acquired, is a portion of the entire image, a region of interest (ROI) may be set at the image portion, and only the image information corresponding to the ROI may be utilized as the image information S.

Figure 2:
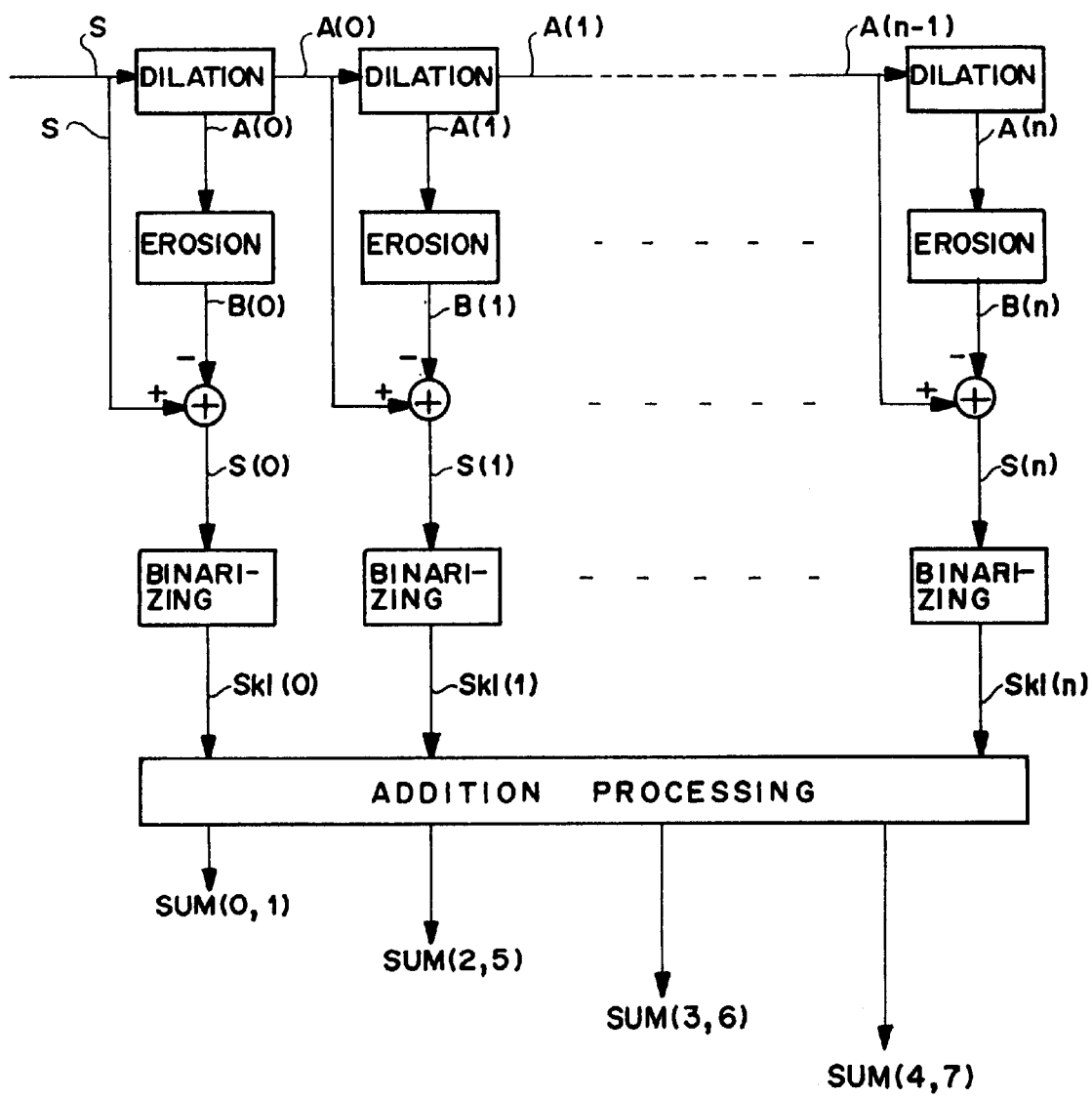
FIG. 2 is a flow chart showing how skeleton processing is carried out by a morphology operation means 10 in the embodiment of FIG. 1.

As illustrated in FIG. 2, in the skeleton processing carried out by the morphology operation means 10, the dilation processing is carried out eight times (n=0~7) on the image information S to be processed. In this manner, pieces of image information A(0), A(1), ..., A(7) are obtained from the eight times of dilation processing. Thereafter, erosion processing is carried out on each of the pieces of image information A(0), A(1), ..., A(7). Pieces of image information B(0), B(1), ..., B(7) are obtained from the erosion processing. Each piece of image information B(n) is then subtracted from the image information A(n−1) prior to the corresponding dilation processing. (In such cases, A(−1) is equal to S.) In this manner, pieces of difference image information S(n)={A(n−1)−B(n)} are obtained.

Each of the obtained pieces of difference image information S(n) is binarized with a predetermined threshold value. In this manner, pieces of skeleton image information Skl(n)={Skl(0), Skl(1), Skl(2), Skl(3), Skl(4), Skl(5), Skl(6), Skl(7)} are obtained.

Further, of the pieces of skeleton image information Skl(n), those for (i, j) satisfying the condition of $i \leq n \leq j$ are used. In this manner, sum set image information represented by the logical sum SUM(i, j)=Skl(i)+Skl(i+1)+...+Skl(j) is obtained. By way of example, SUM(0, 1), SUM(2, 5), SUM(3, 6), and SUM(4, 7) are appropriate.

The four pieces of sum set image information SUM(0, 1), SUM(2, 5), SUM(3, 6), SUM(4, 7) and the eight pieces of skeleton image information Skl(0), Skl(1), Skl(2), Skl(3), Skl(4), Skl(5), Skl(6), Skl(7) are outputted from the morphology operation means 10 as the bone image information Sb, which is the results of the skeleton processing.

Figure 3:
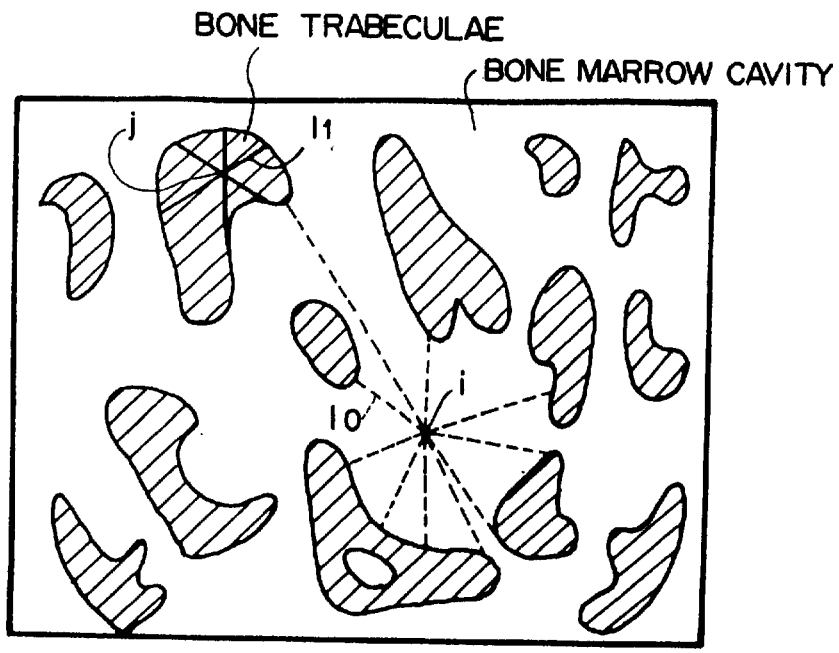
FIG. 3 is an explanatory view showing an index value in accordance with a star volume technique.
Figure 4:
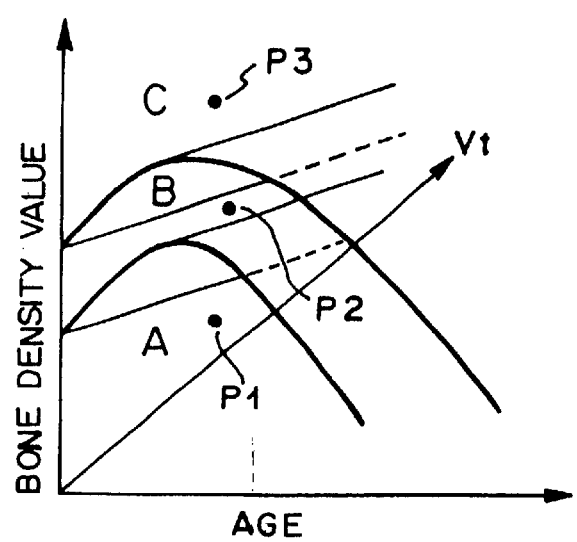
FIG. 4 is a graph showing an example of a technique for judging the condition of a bone tissue.
Figure 5:
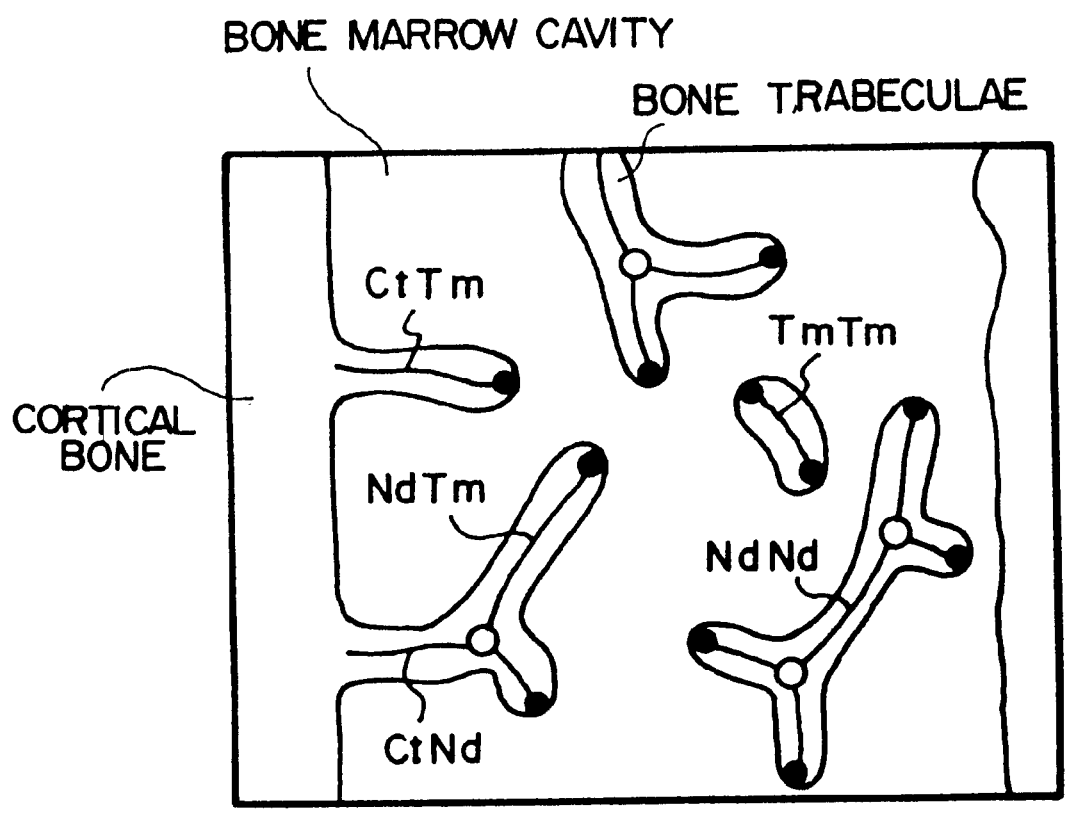
FIG. 5 is an explanatory view showing an index value in accordance with a node-strut analysis technique.
Figure 6A:
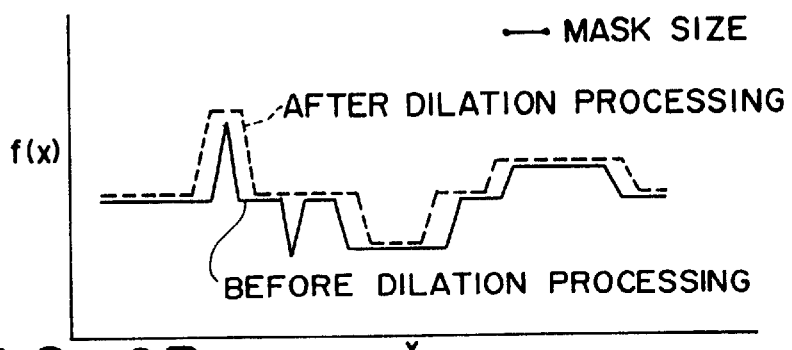
FIG. 6A is a graph showing how a dilation processing, which is one of fundamental morphology operations, is carried out.
Figure 6B:
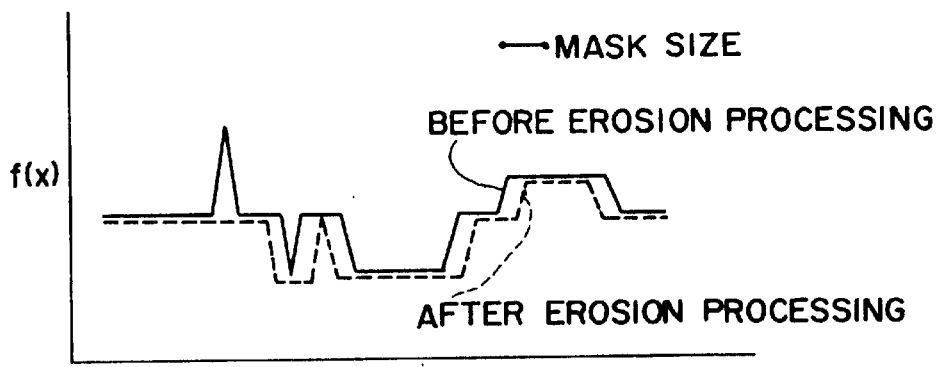
FIG. 6B is a graph showing how an erosion processing, which is one of fundamental morphology operations, is carried out.
Figure 6C:
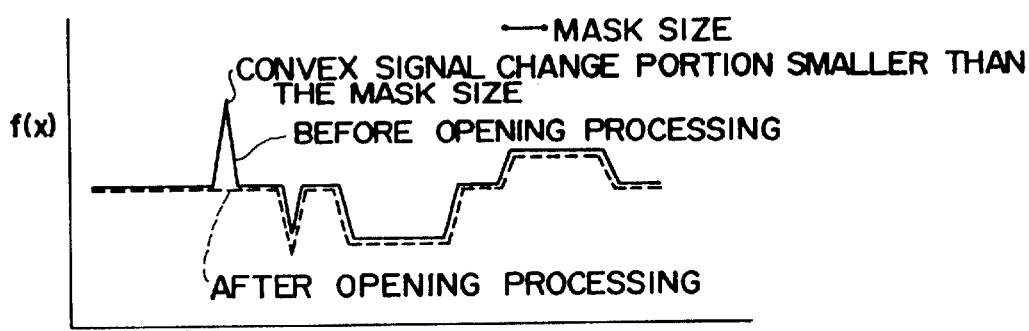
FIG. 6C is a graph showing how an opening processing, which is one of fundamental morphology operations, is carried out.
Figure 6D:
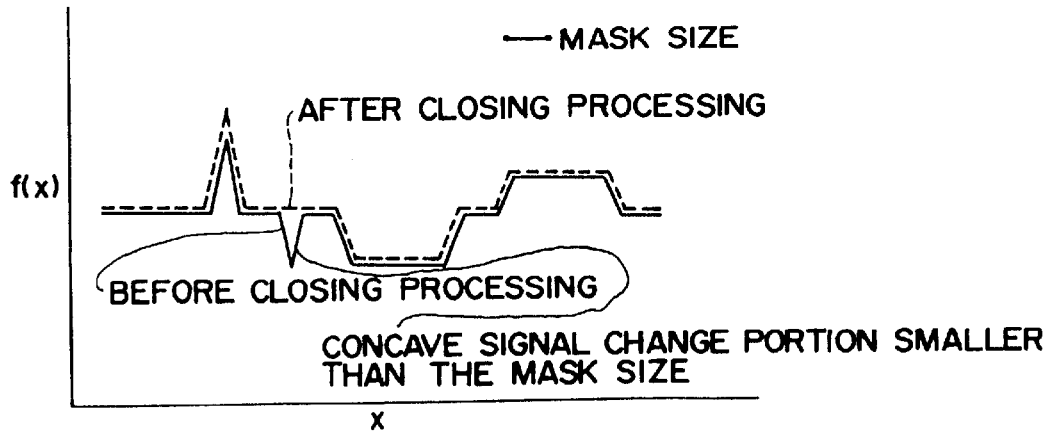
FIG. 6D is a graph showing how a closing processing, which is one of fundamental morphology operations, is carried out.
Figure 7:
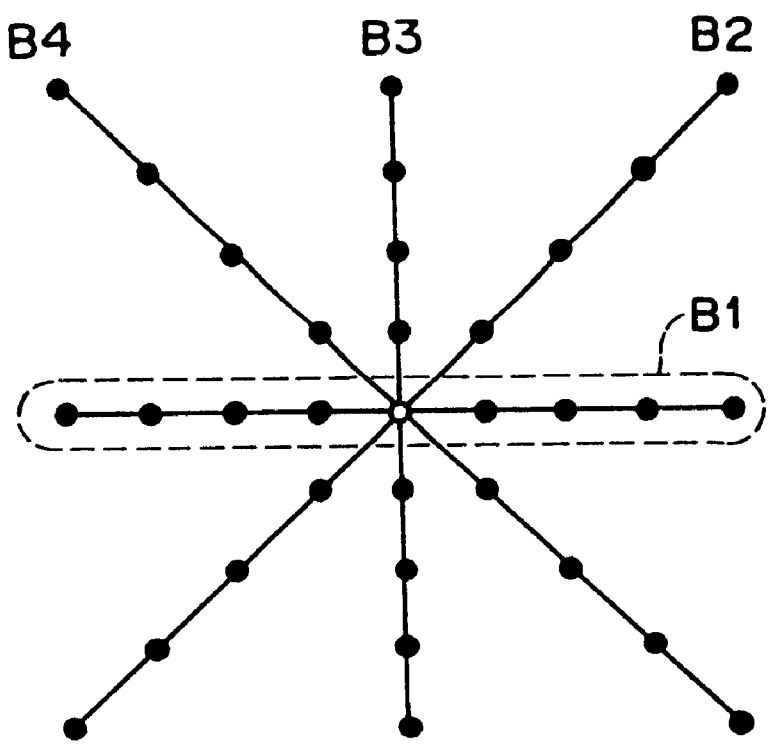
FIG. 7 is an explanatory view showing structure elements Bi employed in morphology processing.
Figure 8A:
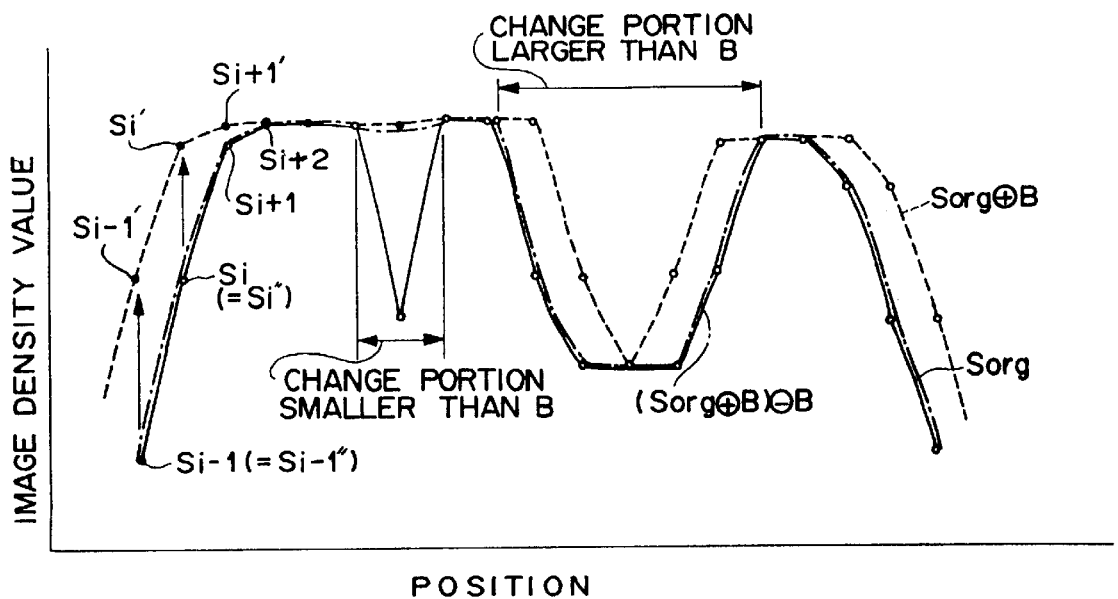
FIG. 8A is a graph showing a distribution of image density values, the graph serving as an aid in explaining how closing processing is carried out.
Figure 8B:
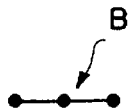
FIG. 8B is an explanatory view showing a linear structure element B, which is constituted of three picture elements.
Figure 9A:
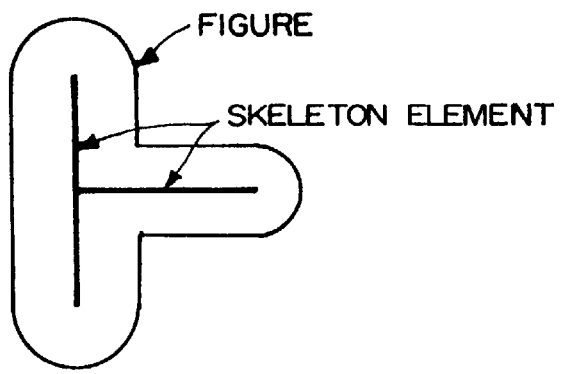
FIGS. 9A, 9B, 9C, 9D, and 9E are explanatory views showing various figures and their skeletons.
Figure 9B:
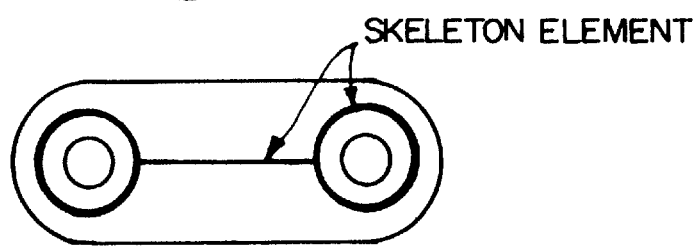
Figure 9C:
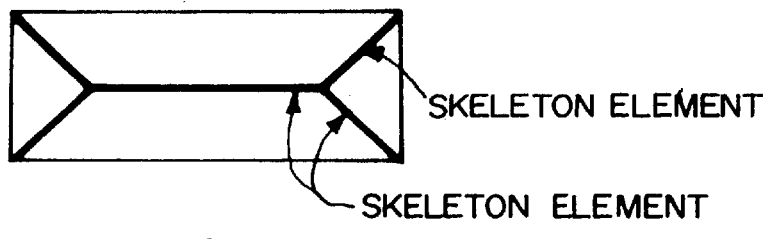
Figure 9D:
Figure 9E:
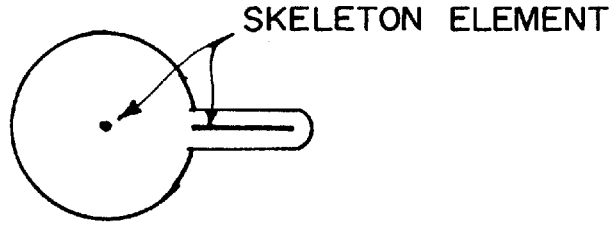

In this embodiment, as the processing for calculating the index value Vt representing the condition of the structure of the bone tissue Pb represented by the bone image information Sb, which processing is carried out by the bone structure index value calculating means 20, the star volume technique described above is employed. In this embodiment, with the star volume technique, by way of example, 40 directions at intervals of 9 degrees are set as the radial directions extending from a point in the bone trabeculae. Also, as the index value, which represents the condition of the structure of the bone tissue, the index value vt is calculated, which represents the mean value of the values of the volume of the regions (shown in FIG. 3), which extend from a point in the bone trabecula along all directions (40 directions) to the end of the bone trabecula.

In such cases, firstly, an index value vtj with respect to an arbitrary sampling point j is calculated with Formula (2) shown below.

$$Vtj = (\pi/3) \times \Sigma l_1^4 / \Sigma l_1 \qquad (2)$$

wherein $l_1$ represents the length, over which the bone trabecula is continuous along an arbitrary direction extending from the point j. The values of $l_1$ are calculated with respect to all of radial directions extending from the point j, and $\Sigma$ represents the calculation of the sum of the values with respect to all of the radial directions.

Also, Vtj is calculated for each sampling point, and the mean value of the Vtj values, which have been calculated for all of the sampling points, is taken as the index value Vt.

How the bone measurement apparatus 100 operates will be described hereinbelow.

Firstly, the radiation image information S containing the bone image information Sb described above is fed into the morphology operation means 10. As illustrated in FIG. 2, the morphology operation means 10 carries out the skeleton processing on the received image information S and thereby extracts the bone image information Sb.

The obtained bone image information Sb is fed into the bone structure index value calculating means 20. The bone structure index value calculating means 20 calculates the Vt value, which represents the condition of the structure of the bone tissue, in accordance with the received bone image information Sb and by using Formula (2) shown above.

Information representing the thus calculated index value Vt is fed out of the bone measurement apparatus 100 and utilized in making a diagnosis of osteoporosis, or the like.

As described above, with the bone measurement apparatus 100, the image information, in which the bone tissue pattern embedded in the radiation image has been accurately separated from the soft tissue pattern, can be obtained from the skeleton processing in accordance with the morphology operation. In accordance with the image information, which represents the bone tissue pattern having been accurately extracted in the manner described above, the index value representing the condition of the structure of the bone tissue is calculated. Therefore, the information useful for diagnosis of the bone structure can be obtained as the quantitative index value. Also, the useful information can be obtained accurately from the radiation image.

In this embodiment, the bone structure index value calculating means 20 calculates the Vt value, which represents the mean value of the values of the volume of the bone trabeculae, as the index value representing the condition of the structure of the bone tissue. However, the bone measurement apparatus in accordance with the present invention is not limited to the aforesaid embodiment. For example, the bone structure index value calculating means may calculate, as the index value representing the condition of the structure of the bone tissue, the Vm value (represented by Formula (1)) representing the mean value of the values of the bone marrow cavity volume. The bone structure index value calculating means may also calculate, as the index value representing the condition of the structure of the bone tissue, one of index values in accordance with the node-strut analysis technique, such as the ratio (%) of the length of each strut to the sum $T_{SL}$ of lengths of all struts, the ratio of the length of each strut to the area of the bone tissue (in this case, the sum of the bone trabeculae and the cortical bone, or only the bone trabeculae), the number of the connection points, the number of the terminal points, and the like.

What is claimed is:

1. A bone measurement method, in which an index value representing a condition of a structure of a bone tissue is acquired, the method comprising the steps of:

i) carrying out bone tissue pattern emphasis processing on a radiation image of an object, which contains at least the bone tissue, said bone tissue pattern emphasis processing being carried out in accordance with a morphology operation, and ii) carrying out index value acquisition processing on a bone tissue image, which has been obtained from said bone tissue pattern emphasis processing and represents an emphasized pattern of the structure of the bone tissue, wherein said bone tissue pattern emphasis processing is skeleton processing, and wherein said skeleton processing emphasizes said radiation image of said object by representing said radiation image of said object with one or more skeleton elements.

2. A method as defined in claim 1 wherein said index value acquisition processing is processing in accordance with a star volume technique.

3. A method as defined in claim 1 wherein said index value acquisition processing is processing in accordance with a node-strut analysis technique.

4. A bone measurement apparatus, comprising a bone structure index value calculating means for calculating an index value representing a condition of a structure of a bone tissue, wherein the apparatus further comprises a morphology operation means for carrying out bone tissue pattern emphasis processing on a radiation image of an object, which contains at least the bone tissue, said bone tissue pattern emphasis processing being carried out in accordance with a morphology operation, and the bone structure index value calculating means carries out index value acquisition processing on a bone tissue image, which has been obtained from said bone tissue pattern emphasis processing and represents an emphasized pattern of the structure of the bone tissue, wherein said bone tissue pattern emphasis processing carried out by said morphology operation means is skeleton processing, and wherein said skeleton processing emphasizes said radiation image of said object by representing said radiation image of said object with one or more skeleton elements.

5. An apparatus as defined in claim 4 wherein said index value acquisition processing carried out by said bone structure index value calculating means is processing in accordance with a star volume technique.

6. An apparatus as defined in claim 4 wherein said index value acquisition processing carried out by said bone structure index value calculating means is processing in accordance with a node-strut analysis technique.

* * * * *